(12) United States Patent
Antalffy et al.

(10) Patent No.: US 9,235,820 B2
(45) Date of Patent: Jan. 12, 2016

(54) SYSTEMS AND METHODS FOR MODIFYING AN OPERATING PARAMETER OF A COKING SYSTEM AND ADDING A COKE DRUM

(71) Applicant: FLUOR TECHNOLOGIES CORPORATION, Aliso Viejo, CA (US)

(72) Inventors: Leslie P. Antalffy, Houston, TX (US); Kenneth D. Kirkpatrick, Sugar Land, TX (US); George Miller, Needville, TX (US); Barry Millet, Pasadena, TX (US); Charles Maitland, Houston, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 191 days.

(21) Appl. No.: 13/666,834

(22) Filed: Nov. 1, 2012

(65) Prior Publication Data

US 2014/0122141 A1    May 1, 2014

Related U.S. Application Data

(63) Continuation-in-part of application No. 13/666,753, filed on Nov. 1, 2012.

(51) Int. Cl.
*G05B 19/4065* (2006.01)
*G06Q 10/06* (2012.01)

(52) U.S. Cl.
CPC ..................................... *G06Q 10/06* (2013.01)

(58) Field of Classification Search
CPC combination set(s) only.
See application file for complete search history.

(56) References Cited

U.S. PATENT DOCUMENTS

| | | | |
|---|---|---|---|
| 3,472,761 A | 10/1969 | Cameron | |
| 3,745,110 A | 7/1973 | Allred | |
| 4,634,500 A * | 1/1987 | Elliott et al. | 201/39 |
| 4,929,339 A | 5/1990 | Elliott, Jr. et al. | |
| 5,522,428 A * | 6/1996 | Duvall | 137/624.11 |
| 5,795,445 A * | 8/1998 | Boswell et al. | 201/39 |
| 5,827,403 A * | 10/1998 | Boswell et al. | 202/268 |
| 6,209,390 B1 * | 4/2001 | LaRue et al. | 73/112.01 |
| 6,343,251 B1 * | 1/2002 | Herron et al. | 701/100 |
| 6,435,018 B1 * | 8/2002 | Murakami et al. | 73/114.01 |
| 6,490,543 B1 * | 12/2002 | Jaw | 702/184 |
| 6,542,853 B1 * | 4/2003 | Murakami et al. | 702/183 |
| 6,763,312 B1 * | 7/2004 | Judd | 702/56 |
| 6,871,160 B2 * | 3/2005 | Jaw | 702/182 |
| 6,907,384 B2 * | 6/2005 | Adachi et al. | 702/184 |
| 6,944,572 B2 * | 9/2005 | Ushiku et al. | 702/181 |
| 7,143,007 B2 * | 11/2006 | Long et al. | 702/184 |
| 7,206,719 B2 * | 4/2007 | Lindsay et al. | 702/177 |
| 7,328,128 B2 * | 2/2008 | Bonanni et al. | 702/182 |
| 7,457,785 B1 * | 11/2008 | Greitzer et al. | 706/12 |
| 7,813,906 B2 * | 10/2010 | Shiromaru et al. | 703/7 |
| 8,255,171 B2 * | 8/2012 | Balestra | 702/35 |

(Continued)

OTHER PUBLICATIONS

Boswell, Richard, Remaining Life Evaluations for Coke Drums, Stress Engineering Services, Inc., Apr. 26, 2011.*

(Continued)

*Primary Examiner* — Scott L Jarrett
(74) *Attorney, Agent, or Firm* — Fish & Tsang LLP

(57) ABSTRACT

Systems for analyzing a benefit or detriment of (1) changing an operational condition or parameter, or (2) adding a coke drum to an existing coking system are disclosed. Contemplated systems can increase the cost effectiveness of coking systems by providing valuable analysis data.

22 Claims, 2 Drawing Sheets

(56) References Cited

U.S. PATENT DOCUMENTS

| | | | |
|---|---|---|---|
| 2002/0179493 | A1 | 12/2002 | Etter |
| 2008/0147571 | A1* | 6/2008 | Greiner et al. ............... 705/400 |
| 2009/0007690 | A1* | 1/2009 | Hesse ............................. 73/799 |
| 2010/0153080 | A1* | 6/2010 | Khan et al. ........................ 703/7 |
| 2010/0318246 | A1* | 12/2010 | Bieker et al. .................... 701/19 |
| 2013/0003071 | A1* | 1/2013 | Mamidipudi et al. ........ 356/448 |
| 2014/0116871 | A1* | 5/2014 | Antalffy et al. ................. 202/96 |

OTHER PUBLICATIONS

Clark, Rick D. et al., Coke Drum Life Improvement—A Combined Approach, CIA Inspection Inc., AIChe 2002, Mar. 10-14, 2002.*

Coke Drum Remaining Life—Problem of the Month—Coke Drum Life, Barringer1.com, Mar. 1997.*

Boswell, Richard S., Remaining Life Evaluations of Coke Drums, Energy Engineering Conference, Jan. 29, 1997.*

Mulraney, Don et al., Coker design achieves cycle times, throughput needs at Kansas refinery, Oil & Gas Journal, Aug. 3, 2009.*

Stewart, Coby et al., Coke drum design, PTQ, Third Quarter, 2006.*

Pieper, Charles J. et al., Coke Drum Design—Longer Life Through Innovation, AIChe 2000, Mar. 5-9, 2000.*

Ruparel, Shivangi et al., Fitness Evaluation of Bulging in Delayed Coke Drums, Institute of Technology, Nirma University, Dec. 2011.*

Allevato, Cluadio et al., Assessing the structural integirty and remaining life of Coke Drums with Acoustic Emissions Testing, Strain Gaging and Finite Element Analysis, ETCE'99 Symposium on Plant and Facilities Relaibility and Mechanical Integrity, 1999.*

Barrigner, Paul H., A Life Cycle Cost Summary, International Conference of Maintenance Socieities, ICOMS 2003, May 20-23, 2003.*

Greitzer, Frank L. et al., Predicting Remaining Life of Mechanical Systems, Intelligent Ship Symposium IV, Apr. 2-3, 2001.*

Sikos, Laszlo et al., Reliability, availability and maintenance optimisation of heat exchanger networks, Applied Thermal Engineering, Feb. 2009.*

Elliot, J.D., "Fine-tune your delayer coker: obstacles and objective", Hydrocarbon Processing, Sep. 2004 issue, pp. 83-30.

Ellis, P.J. et al., "Tutorial: Delayed Coking Fundamentals", Great Lakes Carbon Corporation, Port Arthur, TX, presented at AIChE 1998 Spring National Meeting, New Orleans, LA, Mar. 8-12, 1998.

Miller, G. et al., "A Fresh Look at 3 Drum Cokers", Fluor, Coking Safety and Reliability Seminar, Galveston, TX, May 1-4, 2012.

Kirkpatrick, Kenneth et al, A Fresh Look at 3 Drum Cokers, Coking Safety & Reliability Seminar, Moody Gardens, Galveston, Texas, May 1-4, 2012.

Elliot, J.D., Fine-tune your Delayed Coker: Obstacles and Objectives, Hydrocarbon Processing, Sep. 2004, pp. 83-90.

OSHA publication, Hazards of Delayed Coker Unit (DCU) Operations, Aug. 2003, pp. 1-8.

* cited by examiner

SYSTEMS AND METHODS FOR MODIFYING AN OPERATING PARAMETER OF A COKING SYSTEM AND ADDING A COKE DRUM

This application is a continuation-in-part of U.S. patent application Ser. No. 13/666,753 filed on Nov. 1, 2012. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is multiple drum coking systems.

BACKGROUND

The following background discussion includes information that may be useful in understanding the present invention. It is not an admission that any of the information provided herein is prior art or relevant to the presently claimed invention, or that any publication specifically or implicitly referenced is prior art.

Delayed coking is a well known thermal cracking process used in various refineries that converts a residual feed into solid carbonaceous material (e.g., petroleum coke). The use of multiple drums in coking systems allows the coke drums to operate continuously. Generally, while one drum in a multiple drum system is being filled with a feed stream, another is being stripped, cooled, decoked, pressure checked, or warmed up (See e.g., http://www.coking com/DECOKTUT.pdf and http://www.coking com/SeminarUSA/Presentati on-PDFs2012/FLUOR_BMilletKirkpatrick_FreshLookAt 3DrumCokers_CokingCom_Galv_2012.pdf.).

Coking systems can sometimes be modified by adding a coke drum, replacing a coke drum, or shortening or expanding cycle times (e.g., step cycle (e.g., warm up time, drain time, etc.), drum cycle, system cycle, etc.). As used herein, a "step cycle" or "step cycle time" is the amount of time it takes one drum to complete a step (e.g., warm up, stripping, filling, etc.) in the delayed coking process. A "drum cycle time" or "drum cycle" is the amount of time it takes a single drum to complete all steps in the delayed coking process, from warming up to decoking A "system cycle" or "system cycle time" is the amount of time it takes for all drums in the delayed coking process to complete a drum cycle. Each of the cycled can be altered (e.g., shortened or expanded). Some examples of modifying coking systems are described in "*Fine-tune your delayed coker: obstacles and objectives*" by J. D. Elliot (September 2004), found at http://www.fwc.com/publications/techpapers/files/Fine%20tune%20your%20delayed%20coker.pdf.

While the above cited reference describes some possible modifications to existing coking systems, and some considerations in implementing a modification, it fails to provide either a system for analyzing effects of potential or actual modifications, or operating recommendations based on the analysis. Thus, there is still a need for improved systems for analyzing an effect of modifying a coking system, and providing recommendations.

SUMMARY OF THE INVENTION

The inventive subject matter provides apparatus, systems and methods in which an existing coking system can be improved by estimating an altered life span of an existing drum, and analyzing an effect of modifying the coking system (e.g., adding a drum, modifying an operating parameter, etc.) on the altered life span. Such systems and methods can have many salutary effects, including for example helping to assure that loss of one coke drum (e.g., for repairs, replacement, or even maintenance) will not affect the productivity of remaining coke drums of a system, reducing the likelihood of avoidable repairs and replacement, or increasing the cost effectiveness of coking systems.

As used herein, a "design life span" is an amount of time a drum can operate without repair or replacement under standard operating conditions. An "altered life span" is a life span of a drum as altered from a design life span due to one or more causes. For example, a drum designed to last 20 years under standard operating conditions and parameters without repair or replacement has a design life of 20 years. Where a cycle time (e.g., a step cycle time, a drum cycle time, or a system cycle time) is reduced, the drum would have an altered life span of less than 20 years (e.g., 10 years) absent additional changes. Where a more gradual quench rate is implemented, an altered life span would be greater than 20 years (e.g., 25 years) absent additional changes.

As shown above, it is contemplated that altered life spans can be shorter or longer than a design life span. The cause of deviation from the design life span could be a damage or an improvement caused by a shortened life cycle, operation under damaging conditions, operation under improved conditions (i.e., better than standard operating conditions), an accident, a quench rate, a warm-up rate, or any other deviation from standard operating conditions.

The term "a standard operating condition or parameter" is used very broadly and could include, for example, a predetermined temperature or range thereof, a predetermined operating parameter (e.g., a step cycle time, etc.), a grade or type of feed used, a grade or type of coke produced, or any other predetermined condition or parameter that forms a basis for determining a design life span.

In some aspects of the inventive subject matter, a coking system transmits coke drum data to an analysis engine that analyzes an effect of adding a coke drum to the existing system. The engine can then transmit a recommendation, question, or other result to a user device.

Coke drum data can comprise raw data received by a device of the existing coking system, an estimated altered life span of a drum based at least in part on the raw data, or an estimated time to failure of a drum based at least in part on the raw data. Raw data can comprise any data related to a coke drum received by a sensor. This includes for example, damage (e.g., bulging, cracking, thinning, problematic temperature gradient), a temperature, a pressure, a stress, or any other data related to a coke drum.

An estimation of an altered life span or time to failure can be made at any time during a drum life cycle (e.g., prior to operation of the drum, during standard operations, after a detection of a damage, after a change in step cycle time or procedure, etc.), and can be estimated by a sensor, a module communicatively coupled with the sensor, an operator, or an analysis engine.

The estimation of an altered life span can be determined, extracted, or otherwise obtained by a person or a computer program (e.g., an analysis engine, etc.). For example, an analysis engine can receive raw coke drum data and analyze, calculate, or estimate an altered life span locally, or receive raw coke drum data and transmit it to an exterior module that calculates and returns an estimation or analysis. Alternatively or additionally, the existing coking system can analyze, calculate, or estimate the altered life span locally (e.g., via a module coupled with a sensor of a coke drum) and transmit an estimation to the analysis engine.

This estimation could be used in analyzing a potential effect(s) of adding an additional coke drum to the coking system, changing an operating condition or parameter, or making any other change to the existing system. The analysis preferably concerns the effect of such change on a life span of at least one drum. For example, it is contemplated that information (e.g., temperature reading, stress, strain, etc.) can be gathered for a short period of time (e.g., 1, 2, or even 3 or more weeks), an estimation of an altered life span can be determined, extracted, or otherwise obtained, and operating procedures can be formulated to maximize the life of one or more coke drums in a system based at least in part on the gathered information or estimation. Alternatively or additionally, information can be gathered on an ongoing or periodic basis (e.g., for months, years, etc.), estimation of an altered life span can be determined, extracted, or otherwise obtained, and operating procedures can be formulated or modified based at least in part on the estimation or information gathered.

Based at least in part on this analysis, a recommendation or question related to the coking system can be provided. Examples of recommendations include for example, a modification to an operating parameter, or an addition of a coke drum.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Figure 1:
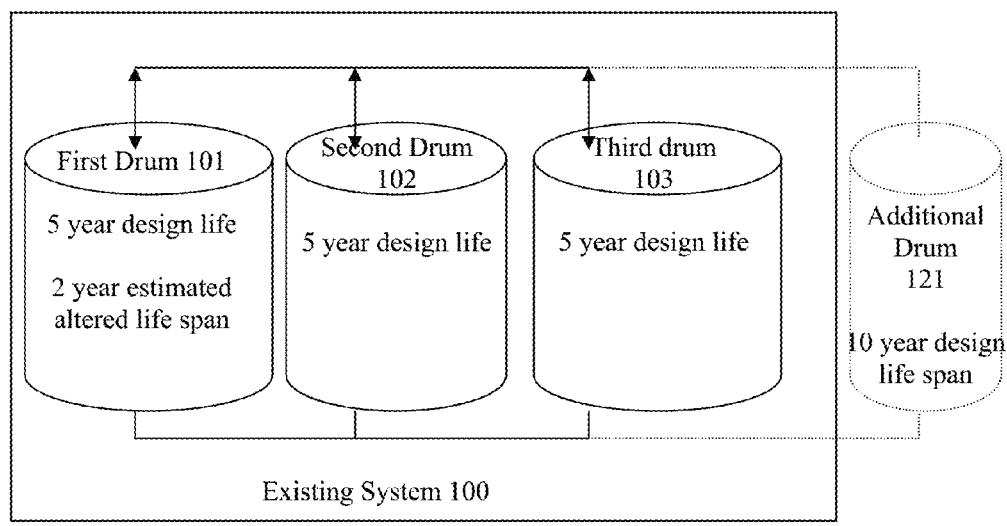
FIG. 1 is a schematic of an existing coking system.

FIG. 1 shows a coking system having a coke drum with an altered life span that could be increased by the addition of a drum. In this example, existing coking system 100 comprises a first, second and third coke drum (101, 102 and 103, respectively). The drums are configured such that first drum 101 receives a vapor of second drum 102 or third drum 103, second drum 102 receives a vapor of first drum 101 or third drum 103, and third drum 103 receives a vapor of first drum 101 or second drum 102.

An "existing coking system" can refer to any of (1) a fully operational coking systems, (2) a coking systems where necessary piping, valves and coke drums are coupled to one another but not yet operations, (3) a planned coking systems that have not been assembled, or (4) a coking system where some components (e.g., drums) are in operation, and some are not.

In coking system 100, each drum requires a vapor (e.g., a vapor stream, etc.) of at least one different drum in order to warm up to a threshold temperature so that it can properly be filled with a feed stream.

Second drum 102 and third drum 103 each have a design life of five years and have been operating under standard operating conditions for three years. As such, each drum has two years remaining if operated under standard conditions. First drum 101, recently installed, has a five year design life with all five years remaining if operated under standard conditions. However, due to first drum 101's reliance on a vapor from at least one of the second drum 102 and third drum 103, first drum 101 has an altered life span of two years.

The addition of drum 121 could increase an altered life span of at least first drum 101 to five years (if drum 101 is configured to receive a vapor of 121), assuming no other changes to operating conditions or parameters are made.

It is also contemplated that the addition of a drum to an existing coking system can shorten an altered life span of a coke drum. For example, first drum 101, second drum 102, and third drum 103, could each be operated with an on-line filling cycle time of 6 hours, and an off-line decoking time of 12 hours. Thus, while a first drum 101 is off-line (e.g., being decoked), the two remaining drums can be filled. Once the first drum has been completely decoked, the two remaining drums will be filled and the first drum can begin a new drum cycle. Adding drum 121 to this system could require that the existing step cycles (e.g., shortened quench cycle) of a drum (e.g., first drum 101) are shortened so that each drum operates continuously. The shortened cycle could strain or otherwise damage first drum 101, and thereby reduce an estimated altered life span.

The life span of a drum can be altered many times during the drum's life. Each change to a coking system's operating condition or parameter can potentially alter the life span of a drum significantly. This altering can be a doubling, tripling, quintupling, halving, or any other suitable altering in life span.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Figure 2:
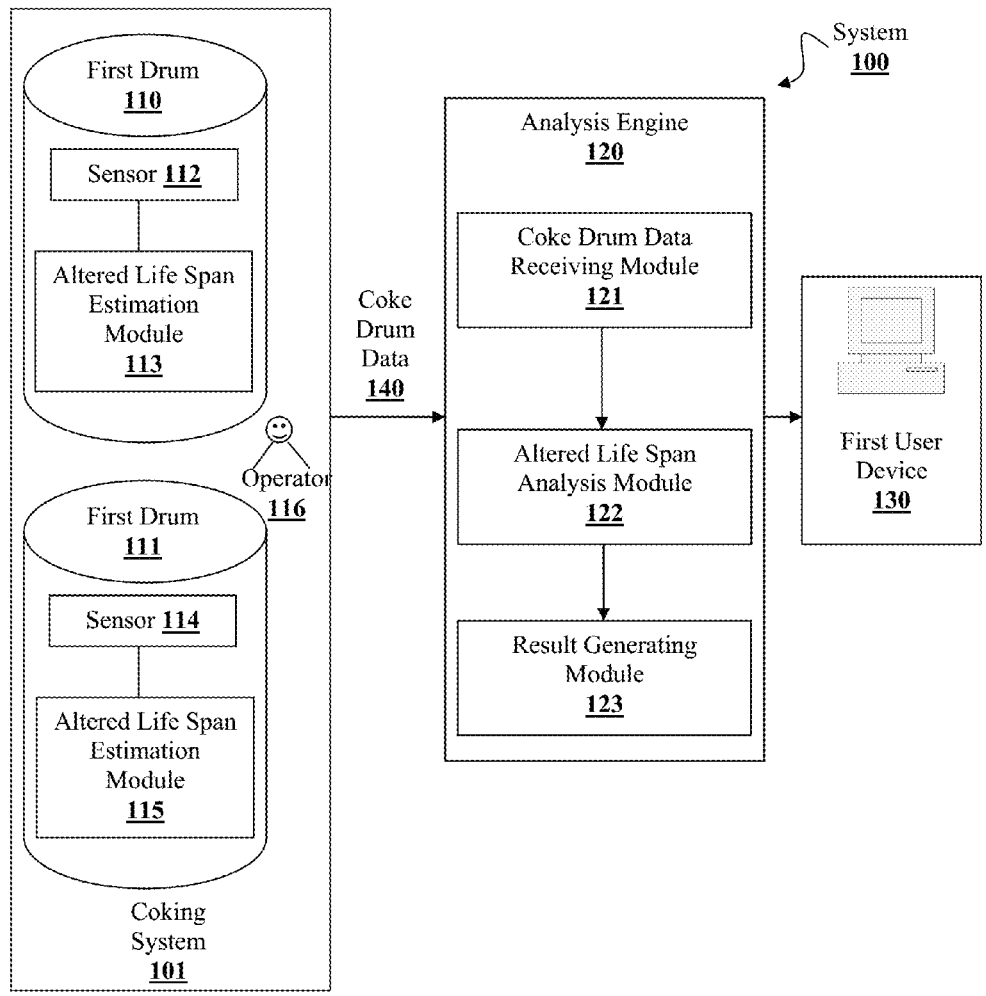
FIG. 2 is a schematic of an embodiment of a system of the inventive subject matter.

FIG. 2 shows a system 100 comprises a coking system 101 communicatively coupled to an analysis engine 120 and user device 130. It is contemplated that each device, engine, or components described herein can be communicatively coupled to one, some or all of the other devices, engines, or components described herein. Moreover, a system (e.g., a coking system) can be coupled to a device(s), engine(s), or combination thereof to create a larger system. This coupling can be temporary, periodic, or continuous, and can be achieved via any suitable wired or wireless means, including for example, Bluetooth™, 802.11, sound, Zigbee™, wireless USB, near field communication, radio frequency identification technology, or cables.

Coking system 101 comprises first drum 110 coupled to a sensor 112 and altered life span estimation module 113, second drum 111 having a sensor 114 and module 115, and an operator 116. It is contemplated that sensors 112 and 114 can either compose, or be coupled to coke drums 110 and 111 on a temporary basis (e.g., removable, etc.). For example, a sensor could be coupled with a coke drum and configured to obtain coke drum data (e.g., temperature, stress, strain, etc.) for a temporary period of time. Alternatively, a sensor could be attached to a coke drum and configured to obtain information periodically or continuously for longer periods of times.

Sensors 112 and 114 are configured to receive raw data related to at least one of the coke drums of system 101. This raw data can be directly sent from a sensor to analysis engine 120, or be used by an altered life span estimation module (113 or 115), or operator 116. An altered life span estimation module can comprise software that uses the raw coke drum data to estimate a change in life span relative to a design life span. This can be achieved using a database of standard operating parameters, modified operating parameters, and corresponding altered life spans. Alternatively or additionally, operator 116 can use the raw coke drum data to estimate a change in life span using any suitable method.

Coke drum data 140 comprising raw coke drum data or altered life span data is sent to analysis engine 120, which comprises coke drum data receiving module 121, altered life span analysis module 122, and result generating module 123. If raw coke drum data is received by module 121, analysis engine 120 can calculate or otherwise receive an estimated altered life span via software that uses the raw coke drum data to estimate a change in life span relative to a design life span.

An estimated life span of a coke drum can be significantly altered by the addition of a coke drum to a system. This altering can be beneficial or detrimental to a coke drum or system. The factors that can contribute to altering a life span include, but are not limited to, a damage (e.g., a bulge, a crack, a thinning in a drum wall, a problematic temperature gradient of a portion of a drum wall, etc.), a change in operating parameter, a change in operating conditions, and an altered life span of another coke drum within the system. Any and all available devices for and methods of detecting or measuring a damage is contemplated.

Inherent in a step of "estimating an altered life span" can be estimating a time to failure. Since an altered life span is relative to a known or estimated design life span, the time to failure can also be estimated. For example, where a drum having a design life span is 10 years and an altered life span is 25 years has been in operation for 2 years, the time to failure would be 23 years.

Coke drum data receiving module 121 can send coke drum data to altered life span analysis module 122. Altered life span analysis module 122 can be located locally in analysis engine 120, or distal to and communicatively coupled with analysis engine 120. Module 122 can be configured to analyze or estimate an effect on an already altered life span based on an addition of a coke drum, a change in operating parameter, or any other change to an existing coking system 101. Similarly to altered life span estimation modules 113 and 115, altered life span analyzing module 122 can calculate or estimate an effect of adding a coke drum or modifying an operating parameter using a database storing, among other things, drum data, design life span data, safety data, use data, data related to a type of feed used, an operating parameter (e.g., cycle time reduction), or life span data corresponding to a change in an operating parameter or condition.

Result generation module 123 can use the analysis provided by altered life span analysis module 122 to generate a result item, such as a recommendation or a question. Some examples of result items include a recommendation to add a coke drum in 6 months, a question asking the user which coke drums are directly coupled with one another, a recommendation to alter a processing parameter to reduce a problematic temperature gradient in a skirt attachment, pressure boundary or supporting element during a quenching step, a recommendation to repair a damage, or a recommendation that a quench rate or cycle be reduced.

Once the result generation module 123 has generated a result item, analysis engine 120 transmits the result item data to first user device 130. Contemplated user devices include computers, tablets, speakers, cellular phones, smart phones, or any other suitable device configured to provide an interface to a user.

Where a result item comprises a question, it is contemplated that a user can input text, image, or sound data (e.g., an answer) to a user device communicatively coupled to an analysis engine. This input data can be used by the analysis engine to receive a result item, which can then be transmitted to a user device.

As used herein, the term "receive" is used very broadly to include for example, obtaining data from another source, or extracting or calculating the data locally.

If the addition of one or more coke drums is recommended or beneficial, it is contemplated that a computer can be configured to produce a physically perceivable rendering of the addition, a schedule for procuring components of the additional coke drum, or a schedule for producing equipment that can be used to install the additional coke drum. The coke drum(s) can be installed in accordance with various coupling plans. Thus, the additional coke drum could be coupled to one, two, or even five or more drums, valves, or piping subsystems.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A system of improving cost effectiveness of a coking system, comprising:
   an operational first coke drum, and a second coke drum;
   a database storing operating parameter data and corresponding life span data;
   a first user device communicatively coupled to a hardware implemented analysis engine and a sensor, wherein the sensor obtains coke drum data associated with the first coke drum on an ongoing or periodic basis, and wherein the data comprises at least one of temperature data, damage data, pressure data and stress data; and
   wherein the hardware implemented analysis engine is communicatively coupled to the database and configured to:
      receive the coke drum data obtained via the sensor on the ongoing or periodic basis;
      generate an estimation of a time to failure of the first coke drum based at least in part on querying the database and the coke drum data received;
      analyze an effect of adding a third coke drum to the coking system on the first coke drum, wherein the effect is an increase in the estimated time to failure;
      transmit to the first user device a recommendation (a) to modify an operating parameter of the first coke drum and (b) to fluidly couple the third coke drum to the first coke drum based on analyzing the effect of adding the third coke drum; and
      modify the operating parameter of the first coke drum based at least in part on the recommendation.

2. The system of claim 1, wherein the first user device is configured to provide a user interface, and wherein the user input is received by the hardware implemented analysis engine via the user interface.

3. The system of claim 1, wherein the recommendation to modify the operating parameter of the first coke drum comprises a recommendation to expand a cycle time or a recommendation to utilize a more gradual quench rate.

4. The system of claim 3, wherein the step of generating the estimation of the time to failure of the first coke drum is made subsequent to detection of a damage in the first drum based at least in part on the coke drum data, and associating the damage with a cycle time.

5. The system of claim 4, wherein the damage comprises bulging.

6. The system of claim 4, wherein the damage comprises a crack.

7. The system of claim 4, wherein the damage comprises thinning in a wall.

8. The system of claim 1, wherein the step of generating the estimation of the time to failure of the first coke drum is made subsequent to detection of a problematic temperature gradient (PTG) of a portion of a wall in the first coke drum, and associating the temperature gradient with a shortened cycle time.

9. The system of claim 8, wherein the recommendation to modify the operating parameter is associated with a reduction to the problematic temperature gradient (PTG) during a heating step.

10. The system of claim 1, wherein the analysis engine is further configured to transmit a recommendation to modify a processing parameter to reduce a problematic temperature gradient (PTG) in at least one of a skirt attachment, a pressure boundary, and a supporting element of the first coke drum during a quenching step.

11. The system of claim 1, wherein the increase in the estimated time to failure results in a second estimated time to failure that is greater than a design life span of the first coke drum minus a number of years the first coke drum has been in operation, and wherein the recommendation comprises operating the first coke drum with a lengthened cycle time.

12. The system of claim 11, wherein the increase in the estimated time to failure results in a second estimated time to failure that is estimated to be at least twice the total of the design life span minus the number of years in operation.

13. The system of claim 11, wherein the increase in the estimated time to failure results in a second estimated time to failure that is at least three times the total of the design life span minus the number of years in operation.

14. The system of claim 1, wherein the second coke drum is operational.

15. The system of claim 1, wherein the coke drum data comprises damage data relating to at least one of a bulge, a crack and a thinning in a wall of the first coke drum.

16. The system of claim 1, wherein the analysis engine is further configured to generate the estimation of the time to failure of the first coke drum based at least in part on a bulge in a wall of the first coke drum.

17. The system of claim 1, wherein the analysis engine is further configured to generate the estimation of the time to failure of the first coke drum based at least in part on a crack in a wall of the first coke drum.

18. The system of claim 1, wherein the analysis engine is further configured to generate the estimation of the time to failure of the first coke drum based at least in part on a thinning in a wall of the first coke drum.

19. The system of claim 1, wherein the analysis engine is further configured to generate the estimation of the time to failure of the first coke drum based at least in part on a problematic temperature gradient in the first coke drum.

20. The system of claim 1, wherein the analysis engine is further configured to produce a physically perceivable rendering of the third coke drum fluidly coupled to the first coke drum.

21. The system of claim 1, further comprising a computer configured to produce a physically perceivable rendering of the third coke drum fluidly coupled to the first coke drum.

22. The system of claim 1, further comprising a computer configured to produce a schedule for procuring at least some components of the third coke drum.

* * * * *